(No Model.)
R. A. BREUL.
SWIVEL.
No. 439,860. Patented Nov. 4, 1890.
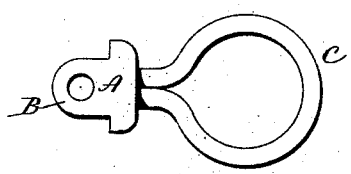 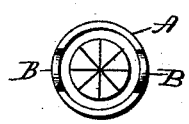 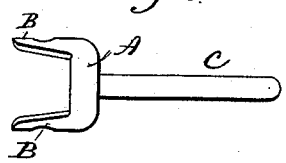
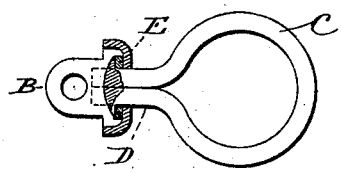
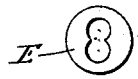 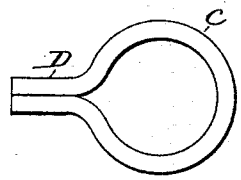

UNITED STATES PATENT OFFICE.

RICHARD A. BREUL, OF BRIDGEPORT, CONNECTICUT, ASSIGNOR TO THE BRIDGEPORT CHAIN COMPANY, OF SAME PLACE.

SWIVEL.

SPECIFICATION forming part of Letters Patent No. 439,860, dated November 4, 1890.

Application filed April 4, 1890. Serial No. 346,574. (No model.)

*To all whom it may concern:*

Be it known that I, RICHARD A. BREUL, of Bridgeport, in the county of Fairfield and State of Connecticut, have invented a new Improvement in Swivels; and I do hereby declare the following, when taken in connection with accompanying drawings, and the letters of reference marked thereon, to be a full, clear, and exact description of the same, and which said drawings constitute part of this specification, and represent, in—

Figure 1, a side view of the swivel complete; Fig. 2, an edge view of the swivel; Fig. 3, an end view looking into the socket; Fig. 4, a sectional side view; Fig. 5, the eye as prepared for introduction; Fig. 6, a face view of the collar.

This invention relates to an improvement in the construction of swivels, such as employed in metal chains, and in which the swivel consists of an eye and the socket, the eye being arranged upon an axis in the socket, and so that the axis is in the direction of the length of the chain, and so that the eye and socket, while forming a firm connection may revolve independent of each other, the object of the invention being the construction of the eye of the swivel from wire doubled, so that its two ends extend into the socket to form the axis, and to firmly unite the eye thus formed with the socket while the metal is cold; and the invention consists in the construction, as hereinafter described, and particularly recited in the claim.

A represents the socket, which is made from sheet metal. The body of the socket is of cup shape, and from the sides of the cup ears B B extend, by means of which connection may be made with one portion of the chain or whatever it may be desired to attach thereto. Through the bottom of the body of the socket an opening is made corresponding to the largest diameter of the shank of the eye.

C represents the eye. It is here represented as of ring shape; but the shape of the eye will be varied according to circumstances. The eye is made from a single piece of wire bent to the required shape by doubling, as seen in Fig. 5, its two ends brought together so as to form a straight shank D. The diameter of this shank through the two branches should be substantially the same, but no greater than that of the opening through the bottom of the socket. This shank is then set through the bottom of the socket, as seen in Fig. 4, its ends projecting into the socket, as represented in broken lines. Then over the end of the shank within the socket a collar E is placed, having an opening through it corresponding substantially to the shape of the two legs of the shank, and as seen in Fig. 6. Then the ends of the two branches of the shank are upset by a series of radial strokes from the center outward, as represented in Fig. 3. This upsetting gives an oval shape to the end of the shank, brings the metal down upon the collar, and because of these radial blows in upsetting the metal of the two ends forming this head are wrought together, so as to substantially unite them as practically an integral part one of the other, and as represented in Fig. 4. The best instrument for thus upsetting the end of the shank presents a sharp edge, so that the upsetting produces a series of radial ribs and depressions, as represented in Fig. 3, this operation forcing the metal of one branch into the metal of the other to produce the union described.

The collar E, introduced between the upset head of the shank and the bottom of the socket, forms a bearing between the inner surface of the socket and the shank, and the upsetting is made upon the collar. Hence there will be a smooth working-surface between the shank and socket, and the whole article is produced cold, it being understood that the socket is best drawn up cold from sheet metal.

I claim—

The herein-described chain-swivel, consisting of the socket A and the eye C, the said socket having an opening through its bottom, and provided with means for attaching it to one part of the chain or analogous article, the said eye made from wire doubled to form the eye proper, the two ends brought together to form the shank, the said ends extending through the opening in the bottom of the socket, and a collar set around the shank within the socket, the opening through the collar corresponding substantially to the shape of the two parts of the shank, the said two ends upset together upon said collar, substantially as described.

RICHARD A. BREUL.

Witnesses:
JOHN CUMMINGS,
L. FOWLER.